United States Patent
Tracy et al.

(10) Patent No.: US 7,861,955 B2
(45) Date of Patent: Jan. 4, 2011

(54) WET-GRINDING GYPSUM WITH POLYCARBOXYLATES

(75) Inventors: Sharon Louise Tracy, Buffalo Grove, IL (US); David B. McDonald, Glenview, IL (US); Qingxia Liu, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 456 days.

(21) Appl. No.: 11/985,515

(22) Filed: Nov. 15, 2007

(65) Prior Publication Data

US 2009/0127360 A1    May 21, 2009

(51) Int. Cl.
*B02C 19/00* (2006.01)

(52) U.S. Cl. .......................................... 241/16; 241/21

(58) Field of Classification Search ............... 241/21, 241/16
See application file for complete search history.

(56) References Cited

U.S. PATENT DOCUMENTS

| | | | |
|---|---|---|---|
| 4,042,748 A | 8/1977 | Hebbel et al. | |
| 4,510,254 A | 4/1985 | Morris et al. | |
| 5,169,894 A | 12/1992 | Holland et al. | |
| 5,338,354 A | 8/1994 | Melville et al. | |
| 6,362,301 B1 * | 3/2002 | Bowe et al. | 528/32 |
| 6,379,458 B1 | 4/2002 | Immordino et al. | |
| 6,402,824 B1 | 6/2002 | Freeman et al. | |
| 6,437,027 B1 | 8/2002 | Isomura et al. | |
| 6,726,997 B2 | 4/2004 | Tamori et al. | |
| 6,777,517 B1 * | 8/2004 | Albrecht et al. | 526/317.1 |
| 6,800,129 B2 | 10/2004 | Jardine et al. | |
| 6,869,474 B2 | 3/2005 | Perez-Pena et al. | |
| 6,953,090 B2 | 10/2005 | Vijn et al. | |
| 6,953,821 B2 | 10/2005 | Tamori et al. | |
| 2004/0072939 A1 | 4/2004 | Cornman et al. | |
| 2004/0188295 A1 | 9/2004 | Hansen | |
| 2005/0109243 A1 | 5/2005 | Jardine et al. | |
| 2005/0224007 A1 | 10/2005 | Savoly et al. | |
| 2005/0239924 A1 | 10/2005 | Lettkeman et al. | |
| 2005/0250888 A1 | 11/2005 | Lettkeman et al. | |
| 2006/0280970 A1 | 12/2006 | Lettkeman et al. | |
| 2007/0186721 A1 | 8/2007 | Laarz et al. | |
| 2008/0229981 A1 * | 9/2008 | Liu et al. | 106/778 |

FOREIGN PATENT DOCUMENTS

| | | |
|---|---|---|
| EP | 0 479 553 B1 | 4/1995 |
| GB | 2 200 103 A | 7/1988 |
| GB | 2 359 074 | 8/2001 |

OTHER PUBLICATIONS

Kari Lehtinen, "Gypsum" Chapter 10, Tappi, 1st Edition, 2000. pp. 152-165.

* cited by examiner

*Primary Examiner*—Faye Francis
(74) *Attorney, Agent, or Firm*—Greer, Burns & Crain, Ltd.; David F. Janci, Esq.; Philip T. Petti, Esq.

(57) ABSTRACT

The process of the present invention includes obtaining a feed material having an initial median particle size. A solution of a polycarboxylate dispersant in water is formed, then the feed material is added to the solution to form a slurry. The slurry is wet-ground to reduce the median particle size of the feed material. Optionally, the total amount of polycarboxylate dispersant is divided into a plurality of doses that are added periodically over the total grinding time.

15 Claims, No Drawings

WET-GRINDING GYPSUM WITH POLYCARBOXYLATES

FIELD OF THE INVENTION

This invention relates to wet grinding of gypsum. More specifically, it relates to grinding of a slurry of gypsum with added dispersants.

BACKGROUND OF THE INVENTION

Finely ground gypsum has many uses. It is added to cosmetics, paper or coatings as a filler. Pure, fine ground gypsum is also useful as a calcium supplement in foods or pharmaceuticals. Preparation of the ground gypsum is done using any known grinding method, particularly wet grinding. The finely ground solid product is useful as a filler in coatings, paper or cosmetics. Ground gypsum is also useful as an additive to food or pharmaceuticals.

Wet grinding of gypsum is an economical method of producing a powder having average particle sizes less than 10 microns. A slurry of gypsum in water flows through a comminution or grinding device, such as a ball mill, and can be recycled through the comminution device as much as necessary to obtain the desired particle size range. It is desirable to grind a slurry that is highly loaded for use in paper coatings. However, highly loaded slurries are difficult to pump. For example, a slurry having a 70% loading by weight (70 wt % gypsum and 30 wt % water), for all useful purposes does not flow at all.

Even when a pumpable slurry is attained, it is difficult to keep it flowing. It has been found that as grinding progresses, the slurry thickens and becomes viscous as the average particle size decreases. While not wishing to be bound by theory, it is believed that grinding exposes fresh, reactive gypsum faces that tightly bind water molecules, causing the slurry to thicken. Thickening of the slurry requires additional energy to pump it through the grinding device, increasing the cost of the entire process.

Dispersants are known for reducing the viscosity of a slurry or solution, but the response of particular dispersants to a specific slurry or solution is unpredictable. For example, dispersants known for use with cements are not necessarily effective in dispersing gypsum solutions. Of the dispersants known to be useful for gypsum slurries, some cause severe retardation in the setting of the hemihydrate form. Knowledge that a particular dispersant is effective in dispersing calcium sulfate slurries does not ensure that the dispersant is suitable for a particular application.

Processes are also known for milling gypsum and a titanium dioxide pigment together in the presence of a dispersant, as shown in U.S. Pat. No. 5,338,354. However, this patent fails to teach or suggest the problem identified and solved by Applicants, the problem of thickening of the gypsum slurry during grinding. There is no suggestion that polycarboxylate dispersants are useful for wet grinding of gypsum in the absence of titanium oxide or that natural landplaster or terra alba are suitable feed materials.

Cement additive compositions that include polycarboxylate dispersants are disclosed in U.S. Pat. No. 6,800,129 ("'129 Patent"). Combining at least two stable suspensions makes the additive composition. The additive composition may be used with clinker or gypsum before or during the grinding operation. However, this reference fails to disclose wet grinding of the feed material, and it would not be understood by an artisan that wet grinding was contemplated. Addition of water to clinker would cause the cement to start to set. The teachings of the '129 Patent would not be suitable for finely grinding the gypsum slurry of this invention.

SUMMARY OF THE INVENTION

Improvements to wet-grinding of gypsum are found in a method of making a finely ground gypsum product that uses a dispersant to grind particles to a smaller particle size than is achievable without it. The dispersant is a polycarboxylate dispersant that is highly effective for fluidizing the gypsum slurry, reducing the product pressure and allowing flow through the grinding media with less power utilization by the pump.

More specifically, the process of the present invention includes obtaining a feed material having an initial median particle size. A solution of a polycarboxylate dispersant in water is formed, then the feed material is added to the solution to form a slurry. The slurry is wet-ground to reduce the median particle size of the feed material. Optionally, the total amount of polycarboxylate dispersant is divided into a plurality of doses that are added periodically over the total grinding time.

Use of the polycarboxylate dispersant allows the slurry to contain higher loadings of solids compared to other wet-grinding processes. Grinding of a slurry with higher solids content reduces the grinding time needed to produce a specific amount of product. This reduces power consumption since less grinding is required. In facilities that are limited by the grinding step, this can also result in overall improvement in process efficiency. Slurries with high solids loading also have other particular uses such as in paper coatings applications.

Where needed, use of this method also allows for longer grinding times to produce a finer product. As grinding proceeds, the viscosity of the slurry increases and places more of a load on the pump. Eventually it is no longer economical to pump the slurry to further reduce the average particle size of the feed material. The efficacy of the polycarboxylate dispersant allows grinding to a higher degree than other dispersants, so that a higher value, more finely ground, product is obtainable.

Reduction in the load on the pump or grinding time also results in a cost savings on the basis of energy usage. Less pumping required less energy. Reduction in fuel that produces energy results in a real savings at a time when fuel costs are very high.

DETAILED DESCRIPTION OF THE INVENTION

This invention relates to preparation of a finely ground feed material. Feed material is added to water to form a slurry, then fed to a grinder or other comminution device. A polycarboxylate dispersant is added to the slurry. Unless otherwise specified, concentrations used in this discussion are weight percents based on the total weight of solids present.

Numerous feed materials are used with the process of this invention. A preferred feed material is gypsum, also known as landplaster or calcium sulfate dihydrate. Other useful feed materials include calcium sulfate anhydrite or calcium carbonate. The use of combinations of the above-listed materials with each other or with other fillers, such as clay, are also contemplated. In some embodiments, the feed material is essentially landplaster.

Preliminary grinding of the feed material may take place prior to introduction to this process. Some grinding is advantageous to allow the feed material to be transported and moved by conveyor conveniently. After the preliminary grinding, the feed material to the present process has an initial particle size distribution. The initial particle size distribution of the feed material depends upon the capacity of the wet grinding mill that is available. Typically, the median particle size of the feed material is from about 10 microns to about 15 microns or from about 12 microns to about 15 microns. Tailings of the feed material are preferably within the 30 to 40 micron range. The present process reduces the initial median particle size of the feed material to a lesser median feed particle size distribution.

Either natural gypsum or synthetic gypsum is used. Natural gypsum required no physical or chemical treatment to render it useful in the intended applications. An especially preferred feed material is terra alba, a high purity, white gypsum having an initial median particle size of about 12-15 microns (United States Gypsum Company, Chicago, Ill.). Since the feed material preferably has an initial median particle size of about 12-15 microns, less grinding is required to reduce the preferred median particle size distribution of 2 microns or less.

Wet-grinding the slurry reduces the average particle size of the feed material compared to the initial average particle size before grinding. The slurry is formed by combining the feed material with water. Any amount of water can be used that produces a flowable slurry. When the amount of water is minimized, energy costs can be reduced since less water will need to be evaporated when the finely ground product is dried. In preferred embodiments, the solids loading is at least 40% by weight. Loading of the feed material to 55% by weight or higher is more preferred. Preferably, the feed material is ground to an average particle size of less than 2 microns, with the largest particles less than 10 microns.

Polycarboxylate dispersants are used to reduce the viscosity of the gypsum slurry. The polycarboxylate dispersant includes one or more carboxylate or carboxylic acid repeating units. Examples of suitable repeating units are vinyl groups, acrylic groups, maleic acid groups, and the like. Useful copolymers are polymers that include two or more repeating units that can be arranged in any order along the length of the polymer chain. The dispersant is preferably a comb-branched polyether polycarboxylate. In this arrangement, long chain repeating units are separated by one or more shorter repeating units. Any polycarboxylate having dispersant properties appropriate to the feed material is usable in this invention.

Particularly preferred polycarboxylates have at least three repeating units; an acrylic unit, a maleic acid repeating unit and a long-chain polyether repeating unit. Polycarboxylates of this type are disclosed in U.S. Pat. No. 6,777,517, herein incorporated by reference and hereafter referenced as the "2651-Type Dispersant." The 2651-Type Dispersant has been found to be especially effective in reducing the viscosity of the slurry as it passes through the comminution device. These dispersants are marketed under the names MELFLUX 2641, MELFLUX 2651 and MELFLUX 3L (BASF Construction Polymers GmbH, Trostberg, Germany). High dispersion efficacy allows reduction of the amount of dispersant to be used. This is beneficial to process economics since polycarboxylate components are relatively expensive. It is anticipated that any comb-branched polycarboxylate would be useful in this process. Other useful commercially available dispersants include MELFLUX 1641 (BASF Construction Polymers GmbH, Trostberg, Germany).

Preferably the dispersant is used in amounts of about 0.1% to about 5% based on the weight of the feed material. More preferably, the amount of the dispersant is about 0.4% to about 2.5%. Many embodiments use less than 1% dispersant by weight. The amount of dispersant selected depends primarily on the loading of feed material used in the slurry and the length of grinding needed to reach a specific particle size. Generally, the amount of dispersant increases as the amount of grinding increases. More dispersant is also needed as the loading of the slurry increases. Addition of the dispersant can be in a single dose or a series of small doses. Use of a plurality of doses is discussed in greater detail below.

Use of two or more dispersants in combination is contemplated. However, care must be taken in combining dispersants of different chemical types. For example, combinations of polyethers and polyacrylates are known to gel, limiting the effectiveness of both dispersants.

Where a powdered dispersant is used, a solution is formed by dissolving the polycarboxylate in water. Upon adding the dispersant powder to the water and stirring until the powder is dissolved, a satisfactory solution is obtained. However, preferably, the solution is aged overnight or about 24 hours. When the dispersant solution is aged prior to use, it has been more effective at reducing the viscosity of the gypsum slurry. While not wishing to be bound by theory, it is believed that the dispersant molecule relaxes and becomes at least partially uncoiled. Uncoiling of the molecule is likely to expose more or different reaction sites, changing the reactivity and/or selectivity of the dispersant. Although the aged solution is more effective in dispersing the gypsum particles, solutions that are not aged are also useful in this invention.

The gypsum and the dispersant are added to water to form a slurry. Preferably the dispersant is added to the water before the feed material, however, there is not believed to be a significance in the order of addition. Using the dispersant of this invention, relatively high loadings of solids are possible. Solids are loaded into the solution up to 55% by weight on the basis of the total weight of the solution. Preferred solids loadings are approximately 40 weight % to about 55 weight %.

Optional additives can be added to the slurry to alter one or more properties of the slurry or the converted feed material. Any additives known to alter the properties of the slurry or the ground feed material are added in their conventional amounts. Where a slurry low in calcium is desired, a chelating agent is able to be added to tie up calcium ions, reducing their concentration in solution. The addition of sodium carbonate also reduces the dissolution of calcium ions. Sodium carbonate has also been found to further lower the viscosity of the slurry, and is therefore a preferred additive when used in amounts of about 0.5% to about 0.25% by weight based on the weight of the gypsum solids.

Optionally, a pH modifier is added to enhance aging stability. With some polycarboxylates, control of pH reduces the viscosity increase with time. Increasing the slurry pH to a range of about 8 to about 10 slows the rate of viscosity increase during aging. Control of pH had the largest effect on Melflux 2651 dispersant, while Melflux 3L dispersant showed no response to changes in pH.

In some embodiments, it is advantageous to add the dispersant as a plurality of small doses. As grinding progresses, the slurry becomes more viscous as the grinding exposes new surfaces. The increase in viscosity is often equated with the pressure needed to push the feed material through the grinder and piping to and from the grinder, and referred to as the "product pressure." Even slurries that had good initial flowability increase in viscosity as the grinding continues. In such cases, the addition of a subsequent dose of the dispersant is optionally added to the slurry. The viscosity of the slurry drops again, allowing the slurry to be pumped more easily and economically. If grinding continues and the slurry again becomes viscous, the slurry is optionally redosed with dispersant until a satisfactorily reduced median particle size is obtained. After an initial dose, additional dispersant is suitably added at intervals of about 5 to about 10 minutes. Use of longer or shorter intervals is contemplated, including continuous addition of the dispersant. The intervals need not be regular or time based. Dispersant dosage is also determinable based on the slurry viscosity or pump pressure.

The feed material is ground by any known grinding or comminution apparatus. Examples of suitable grinding apparatus include ball mills, rotary grinders or any aqueous grinding apparatus where low viscosity is beneficial in the product slurry. Where a ball mill is used, silica beads are the preferred grinding media. The slurry is recycled through the grinding apparatus until the desired median average particle size is obtained.

In the following examples, feed material was processed with a Supermill 1.5 wet-grinding mill from Premier Mill, an SPX Process Equipment Company (Delevan, Wis.). The grinding media used was a high density, high crush strength ceramic bead, ZIRCONOX brand cerium-stabilized zirconia (Techno Ceramic Inc., Lower Makefield, Pa.). The feed material, polycarboxylate dispersant, water and additives, if any, were mixed in a five gallon bucket, then charged to the feed tank. The pump was started on low speed and the speed was gradually increased. The mill was started and a rag was used to cover the feed tank to reduce splashing therefrom. Mill speed was adjusted to about 1750 fpm. The first liter of slurry was measured and discarded. The flow rate was measured with a timer and beaker. The material was recirculated prior to taking samples.

All viscosity data was taken using a Brookfield RV viscometer at 50 RPM unless otherwise noted (Brookfield Engineering Laboratories, Inc., Middleboro, Mass.).

EXAMPLE 1

A slurry of 43% solids was prepared from 4500 g of Terra Alba No. 1 powder (United States Gypsum Company, Chicago, Ill.) and 6000 g tap Water. Median particle size for the Terra Alba was 5.2 microns with a top size of 31 microns. Particle size data were measured on a Microtrac X100 Analyzer (Microtrac, Inc., North Largo, Fla.). Weight percents of additives were measured on the basis of the dry terra alba.

Water was added to the feed tank and 0.5 wt % sodium trimetaphosphate was added. The gypsum powder was added to the slurry chamber. Finally, 0.5 wt % Dequest 2006 dispersant, penta sodium salt of amino tri(methylene phosphonic acid), was added to the slurry. The slurry was ground for a total of 20 minutes. Grinding was stopped because the product pressure had risen to 6.1 psi. Samples of the slurry were taken at 10, 15 and 20 minutes. From 10 minutes to 20 minutes, the viscosity of the sample rose from about 1700 cps to almost 7000 cps. Although the median particle size after 20 minutes of grinding was 2.59 microns, the top particle size was 22 microns, much larger than desired.

EXAMPLE 2

A five-gallon pail of terra alba was milled in two trials described below. Sodium carbonate, approximately 11 g, was added to 6000 g water. Next 37.5 g Melflux 2651 dispersant was added to the mixture. Terra alba, in amounts of approximately 7333 g, was introduced into the feed tank.

Additional doses of the Melflux 2651 dispersant were added at 15, 23, 36, and 40 minutes of milling. Each additional dose of 37.5 g of the dispersant reduced the product pressure about 0.1 to 0.2 psi. The maximum product pressure during the trial was 1.7 psi. The total dose of Melflux 2651 dispersant was 1.0 wt % based on the weight of the terra alba. The slurry flow rate after 45 minutes when the trial was terminated was 33.3 mL/s.

In a second trial, the same procedure was used for mixing and loading the slurry into the feed tank. The slurry flow rate was 33 mL/s. Dispersant was dosed, however, the timing of the dosing on this portion of the trial was unclear. Samples from the first trial and the second trial were removed for viscosity measurements at 25, 35 and 45 minutes into grinding. Results of the viscosity testing is shown in Table I below:

TABLE I

| Milling Time | Viscosity (cP) of Trial 1 at shear rate | | Viscosity (cP) of Trial 2 at shear rate | |
|---|---|---|---|---|
| (minutes) | 20 RPM | 50 RPM | 20 RPM | 50 RPM |
| 25 | 467 | 421 | 1917 | 1113 |
| 35 | 1293 | 747 | 1193 | 685 |
| 45 | 617 | 427 | 750 | 447 |

After one day, the slurries from both trials were combined into one five-gallon bucket. The one day viscosities were measured on each batch as well as the combined slurry. These results are presented in Table II below.

TABLE II

| | One-Day Viscosity (cP) of Example 1 at Shear Rate | |
|---|---|---|
| Sample | 20 RPM | 50 RPM |
| Trial 1 | 1492 | 1033 |
| Trial 2 | 1950 | 1090 |
| Combined | 2300 | 1113 |

The slurry density was also measured and found to be 1.48 g/L.

EXAMPLE 3

A five-gallon pail of natural anhydrite was milled in two trials similar to Example 2 above. In the first trial, eleven grams of sodium carbonate was added to 6000 g water. Thirty-seven and one/half grams of Melflux 2651 solution was added to the mixture. Finally, 7333 grams of natural anhydrite were added and the slurry was put into the feed tank. The mill speed was 1750 fpm, and the first liter of diluted slurry was collected and discarded.

Only one additional dose of Melflux 2651 dispersant solution was added at 26:30 minutes of milling. The product pressure decreased 0.4 psi upon its addition. The maximum product pressure during the trial was 1.5 psi. The trial was terminated at 45 minutes with a final product pressure of 1.1 psi. The total dose of Melflux 2651 solids was 0.4% by weight of cement filler.

In the second trial, a similar procedure was used for mixing and loading the slurry into the feed tank. Again, only one additional dose of Melflux 2651 solution was added, but this time at 27 minutes. In this trial, the product pressures were lower, with the maximum product pressure only being 1.2 psi. The Melflux 2651 dose decreased the product pressure from 1.2 psi to 1.0 psi. The final product pressure was 1.0 psi.

Samples of both trials were removed for viscosity measurements at 25, 35 and 45 minutes. The slurries were combined into one bucket, and the combined viscosity was also measured. A compilation of viscosity results from both trials is presented in Table III below.

TABLE III

| Milling Time | Viscosity (cP) of Trial 1 at Shear Rate | | Viscosity (cP) of Trial 2 at Shear Rate | |
|---|---|---|---|---|
| (minutes) | 20 RPM | 50 RPM | 20 RPM | 50 RPM |
| 25 | 1733 | 833 | 513 | 323 |
| 35 | 240 | 229 | 220 | 128 |
| 45 | 840 | 427 | 973 | 536 |
| Combined | 1033 (20 RPM) | | 760 (50 RPM) | |

EXAMPLE 4

In this experiment, sodium carbonate was added with the mix water prior to the Melflux 2651. Six thousand grams (6000 g) of water were added to the feed tank. One dose of Melflux 2651 powder at 0.2 wt % based on the weight of terra alba (9 g) was added to the tank. Since the lightweight powder tends to float on the surface of the water and does not dissolve easily, the water/dispersant mixture was circulated through the grinding media to aid in its solution and dispersion. Terra alba, in an amount of 4500 g, was added to the tank for a total grinding time of 50 minutes. Subsequent doses of the Melflux 2651 were added at 10, 20, 30, 40 and 50 minutes during milling. Grinding time was extended to 60 minutes. The viscosity was decreased to between 76 and 140 cP during grinding.

Product pressure and viscosity between two experiments as detailed above, one with sodium carbonate and the other without it. The sodium carbonate appears to decrease the viscosity until approximately 50 minutes into the trial. This requires less power to be applied to the pump, and the resulting energy savings.

COMPARATIVE EXAMPLE 5

Ethacryl G (Lyondell) dispersant was added to the slurry to reduce the viscosity of the gypsum products. It is a copolymer of polycarboxylate in the backbone and polyether in the side chains. It is a liquid comprising 40% dispersant solids and a pH of 4.0. A total amount of Ethacryl G was measured so that the dispersant solids weighed were 4% by weight of the feed material. The total amount of Ethacryl G was subdivided into 9 doses that were added initially, at 8 minutes, 13, 18, 22, 28, 32, 37, and 43 minutes. The total grinding time was 48 minutes.

A slurry was made by mixing 4500 g Terra Alba No. 1 with 6000 g water. The terra alba had an initial median particle size distribution of 5.2 microns, with a top particle size of 32 microns. The initial dose of Ethacryl G dispersant was added to the slurry and it was wet-ground to reduce the particle size distribution.

The dosing schedule resulted in a slurry having a viscosity of approximately 1000 to about 2500 cps over the 48 minutes of grinding. Median average particle size was reduced to 1.1 microns and the top particle size was 9 microns.

Compared to Ethacryl G dispersant, the Melflux 2651 polycarboxylate dispersant produced greater reduction in viscosity at one-quarter of the dosage. The efficacy of the Melflux 2651 polycarboxylate allows for savings in energy due to lower pump loads, resulting in lower savings. Although polycarboxylate dispersants are generally higher in cost, at this low dose, savings may be realized from the reduction in dispersant use.

While a particular embodiment of the method of wet-grinding a finely ground gypsum product has been shown and described, it will be appreciated by those skilled in the art that changes and modifications may be made thereto without departing from the invention in its broader aspects and as set forth in the following claims.

What is claimed is:

1. A method of making a finely ground product, comprising:
    obtaining a feed material having an initial median particle size, said feed material being selected from the group consisting of landplaster, terra alba, calcium carbonate and calcium sulfate anhydrate;
    forming a solution of a polycarboxylate dispersant in water;
    adding the feed material to the solution to form a slurry, said slurry having a solids loading of at least 40% by weight; and
    wet-grinding the slurry to reduce the median particle size of the feed material.

2. The method of claim 1 wherein said forming step further comprises dispersing the polycarboxylate powder in water and aging the solution at least 12 hours.

3. The method of claim 2 wherein said aging step is at least 24 hours.

4. The method of claim 1 wherein the polycarboxylate dispersant includes at least three repeating units comprising acrylic units, maleic acid repeating units and long-chain polyether repeating units.

5. The method of claim 1 wherein said grinding continues until the median particle size of about 1 micron to about 3 microns.

6. The method of claim 1 wherein said adding step utilizes from about 0.1 to about 5% dry polycarboxylate dispersant based on the weight of the feed material.

7. The method of claim 1 wherein the feed material comprises landplaster.

8. The method of claim 7 wherein the landplaster is naturally mined gypsum.

9. The method of claim 1 wherein said grinding takes place in a ball mill.

10. The method of claim 9 wherein the grinding media in the ball mill includes cerium-stabilized zirconia beads.

11. The method of claim 1 further comprising redosing the dispersant during said grinding process.

12. The method of claim 11 wherein said redosing step occurs at periodic intervals.

13. The method of claim 11 wherein said periodic intervals are regular.

14. The method of claim 13 wherein said regular intervals are from about 5 minutes to about 15 minutes in length.

15. The method of claim 1 wherein said adding step further comprises adding sodium carbonate with the feed material.

* * * * *